United States Patent [19]

McGrath

[11] Patent Number: 4,983,138

[45] Date of Patent: Jan. 8, 1991

[54] INFLATABLE CONTAINER WITH SELF-SEALING VALVE

[76] Inventor: John McGrath, 17743 April Ct., Castro Valley, Calif. 94546

[21] Appl. No.: 265,488

[22] Filed: Nov. 1, 1988

[51] Int. Cl.$^5$ .................. A63H 27/10; F16K 15/16
[52] U.S. Cl. ........................... 446/224; 383/58; 137/512.15; 137/846
[58] Field of Search .............. 446/224, 220; 137/846, 137/849, 844, 512.15, 512.4; 206/522; 383/58, 48, 57, 98

[56] References Cited

U.S. PATENT DOCUMENTS

| 1,008,641 | 11/1911 | Gregory | 446/224 |
| 2,597,924 | 5/1952 | Davenport et al. | |
| 3,113,551 | 12/1963 | Korn | |
| 3,324,877 | 6/1967 | Bochan | 137/512.15 |
| 3,332,415 | 7/1967 | Ericson | 446/224 X |
| 3,381,887 | 5/1968 | Lowry | 383/58 |
| 3,523,563 | 8/1970 | Mirando | 446/224 |
| 3,898,701 | 8/1975 | La Russa | |
| 4,416,308 | 11/1983 | Bower | 137/846 |
| 4,547,168 | 10/1985 | Blacksberg et al. | 446/222 |
| 4,560,360 | 12/1985 | Isaacs et al. | 446/222 |
| 4,586,910 | 5/1986 | Buchanan | 446/220 |
| 4,674,532 | 6/1987 | Koyanagi | 137/512.15 |
| 4,708,167 | 11/1987 | Koyanagi | 137/512.15 |

FOREIGN PATENT DOCUMENTS

| 766588 | 9/1967 | Canada | 383/58 |
| 1211065 | 2/1966 | Fed. Rep. of Germany | 383/58 |
| 1021167 | 3/1966 | United Kingdom | 383/58 |

*Primary Examiner*—Mickey Yu
*Attorney, Agent, or Firm*—Brumbaugh, Graves, Donohue & Raymond

[57] ABSTRACT

A one layer self-sealing, self-regulating, two-way flat valve for fluid containers, such as toy balloons and the like formed of two heat sealed film layers, is provided. The container having two container film layers joined at the perimeters thereof, an exterior opening in one of the layers, and a valve film layer attached to an inner surface of the same container layer. The valve film layer forms an integral fluid channel through which fluid is guided into the container from the exterior opening such that as the container attains maximum fluid capacity, the fluid channel automatically collapses. Perpendicular creases which form along the container surfaces cross the fluid channel to effectively seal the container.

9 Claims, 3 Drawing Sheets

INFLATABLE CONTAINER WITH SELF-SEALING VALVE

FIELD OF THE INVENTION

The present invention relates to fluid containers, such as balloons, flexible tubings and the like, and more specifically, to an integral self-sealing flat valve system for allowing easy inflation and sealing of such containers.

BACKGROUND OF THE INVENTION

Metallized toy balloons generally comprise two peripherally heat sealed panels, each composed of a composite laminate film layer, such as an exterior layer of aluminum, an intermediate layer of plastic, and an inner layer of heat sealable coating.

Valving devices of various configurations are presently used to ensure a reliable seal on such balloons, as well as on flexible tubing and the like. U.S. Pat. No. 4,674,532 is directed to a four layer valving mechanism comprising a two layer longitudinal pouch-like valve situated within a two layer flat inlet pipe. The entire mechanism is then inserted into the balloon opening. This valve arrangement does suffer several drawbacks. The open base end of the valve actually extends into the container body and flaps freely therein in awkward fashion. Further, the mechanism is formed of four film layers separate from and in addition to the two layers of the container for a total of six film layers. The two valve film layers must be bonded closed at the tip end of the valve before insertion into the container so as to ensure the presence of an inlet passage gap through which fluid may flow. Further the pipe sides must be bonded.

These extra construction steps are undesirable as ease of assembly is an important goal during mass production of balloons. Also, the four layer valve mechanism has excess seal joints which provide increased opportunity for unwanted leaks.

In addition, such valves are installed by heat-seal in the container after the container has been made or by a complex in-line system requiring precise registered location of the valve. They also require printing of a non-heat sealable coating on the inner surfaces of the mechanism.

U.S. Pat. No. 4,708,167 is directed to a check valve virtually identical in operation to the above-described prior art device. Other than the fact that this embodiment comprises only five layers as opposed to six, its drawbacks are the same as those for the U.S. Pat. No. 4,674,532.

Also known in the art are two layer flat pipe valves as described, e. g., in U.S. Pat. No. 3,523,563. Like the four layer valves, the two layer valves extend freely into the interior of the balloon. The two layer valve, which is essentially a flat inlet pipe depends upon the "tackiness" of the film materials which causes the valve to seal closed.

Single-layer flat valves have been described in U.S. Pat. Nos. 2,597,924 and 3,523,563. However, it is essential to these past inventions that the valve surfaces be self-adherent. The necessity for providing surfaces which rely on "tackiness" of the film materials is undesirable in manufacturing operations.

A further important consideration in devices of this type are balloon valve filling systems, which act to terminate the filling operation at a pressure below the bursting pressure of the container. Presently, such systems operate independently of the container itself, and typically consist of a regulator of a low pressure or timed flow design installed at filling locations. These regulators act by slowing the rate of flow into the container as maximum pressure nears, thus decreasing filling time efficiency. Further, the regulators described are costly compared to the balloon materials used.

Experience has shown that the valves described in the prior art do not exhibit sufficient prevention of leaks to provide for consistent prolonged use. Also, the need for expensive pressure regulating equipment has not been overcome by the prior art. The present invention seeks to overcome these and other drawbacks of the prior art valves.

Accordingly, it is an object of the present invention to provide a one layer self-sealing flat valve channel characterized by more reliable, and prolonged and effective leak resistance.

It is a further object to provide a fluid container which need not rely on the self-adherence of the valve surfaces for sealing operation.

It is a still further object to provide a fluid container which prevents overfilling by automatically self-sealing when a desired pressure has been reached without the aid of an outside regulator.

It is a further object to provide a fluid container of simple and inexpensive construction which comprises only a single valve layer which forms an inlet valve channel integral with one of the container surfaces.

It is a still further object to provide a fluid container free of any awkward free-standing extensions situated therein by providing a valve integral with one of the container surfaces.

It is an additional object to provide a self-sealing flat valve which may be formed as part of the fluid container itself during the construction thereof.

SUMMARY OF THE INVENTION

This and other objects are attained according to the invention by providing a one layer self-sealing flat valve for fluid containers, such as toy balloons and the like, which are generally formed with two heat sealed balloon film layers with an opening on one of the layers for passage of fluid therethrough. The valve is self-regulating and provides a unique two-way seal which prevents fluid from leaking out as well as preventing the further introduction of fluid once maximum pressure has been reached. The valve of the instant invention comprises a single valve film layer attached to the inner surface of one of the balloon film layers to form an integral fluid channel through which fluid is guided into the container. The flat channel, which extends away from the balloon opening, has towards one end a small passageway meeting the balloon opening and at its opposite end an opening through which the fluid passes into the container body. It is continuously bonded at its exterior points to the inner surface of the balloon along its length.

As the container body becomes filled with fluid, the pressure within the container increases so as to surpass the external pressure at the inlet of the valve, and forces the valve layer to collapse against the inner container surface. The channel becomes flattened and thereby prevents any fluid from exiting therethrough.

The flat valve channel structure also results in additional sealing forces which greatly improve leak resistance. As the container becomes increasingly filled with fluid, the container surface against which the flat channel is formed is stretched tight under the pressure. The valve layer bonded thereto stretches along with the surface. These actions cause stress in a direction across the channel and result in a flattening thereof which sealingly closes off the channel.

An additional and unique sealing effect is present in an embodiment wherein the channel is formed in proximity to the perimeter bond between the two container film layers. As the pressure in the container increases, the container walls form creases along the periphery of the container at the container layer bond. These creases are perpendicular to the channel and cause the container surface to stretch, thereby flattening the channel. The shape of the container should be such that these creases become extremely stiff and tight as the balloon is further inflated. Indeed, the flat valve can be positioned and its dimensions varied in a manner that will allow this force to effectively prevent further inflation of the container at a desired set point that will prevent bursting due to over inflation of a fragile container. This crease across the fill channel is the primary sealing force that allows for a truly two-way seal as opposed to one-way flat valve designs of the prior art.

A further advantage of the present invention is that the stretching of the film layers under pressure will minimize the effect of any micro-leaks in the channel film surface by decreasing the dimensions of such leaks, which may be present due to imperfections in the films and seals.

The invention also provides a self-regulating valve which will automatically self-seal before maximum pressure has been reached, thus significantly decreasing the number of balloons which burst due to unchecked overfilling. This results in a two-way seal which prevents fluid from leaking out as well as preventing the further introduction of more fluid.

Also provided is a signal to the user during filling operation. As the container approaches capacity, the fluid being forced through the flattening channel will cause a whistle or squeak sound to be emitted, thereby notifying the user that the valve has self-sealed and filling operation is complete.

The small exterior opening allows for easy and simple inflation with virtually all common balloon filling systems. Further, the unique construction of the channel acts to baffle air flow when filling so as to result in quieter operation. Also, the chances of "burning a hole" in the balloon film, normally caused by the filler nozzle being too close to a collapsed wall of the balloon filler stem, will be greatly reduced.

BRIEF DESCRIPTION OF THE DRAWINGS

The invention may be better understood from the following detailed description, taken in conjunction with the accompanying drawings, in which.

DETAILED DESCRIPTION OF THE INVENTION

A metallized toy balloon comprises two heat sealed panels, each composed of a composite laminate film layer, such as an exterior layer of aluminum, an intermediate layer of plastic, and an inner layer of heat sealable coating.

Figure 1:
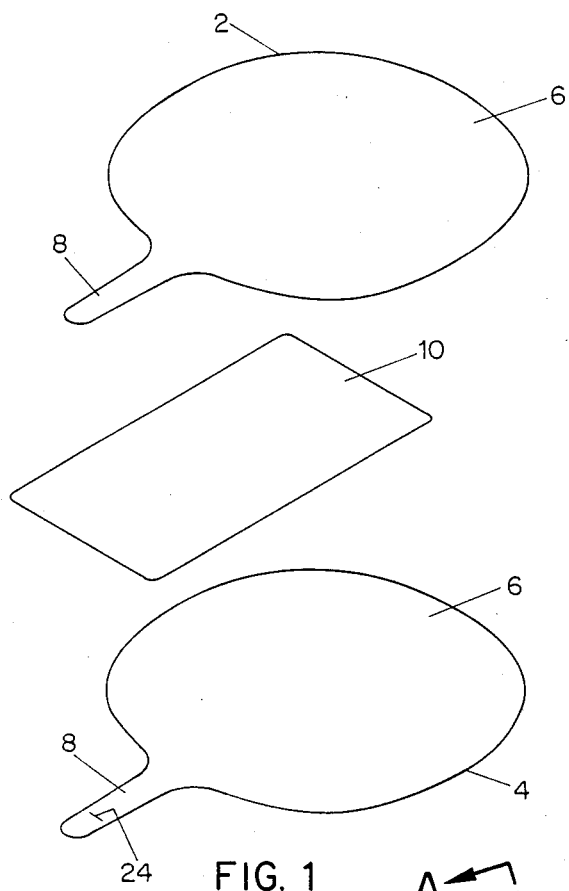
FIG. 1 is an exploded projection view of the balloon of the invention before assembly.

As seen in FIG. 1, two balloon surface film layers, a top layer 2 and a bottom layer 4 are formed in corresponding configurations. The layers 2, 4 comprise a body surface portion 6, which is preferably rounded but may be of any desired shape, and a stem 8. An exterior opening 24 in the form of a slit is present on the bottom layer 4. A valve film layer 10 comprising heat sealable plastic is located between the two surface layers 2, 4.

Figure 2:
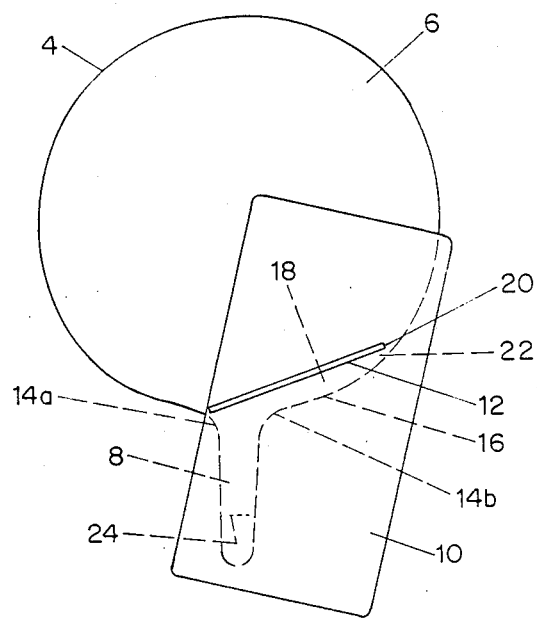
FIG. 2 is a top view after partial assembly showing the bottom balloon film layer and the valve channel film layer.

During assembly of the device, the valve layer 10 is placed on the bottom surface layer 4 as shown in FIG. 2 so as to cover the stem 8 to at least the point encompassing the exterior opening 24. The valve layer 10 must also cover a portion of the body at which an inlet channel will be formed. A first heat seal 12 bonds the valve layer 10 to the bottom layer 4, from a transition point 14a across the stem area 8, leaving a gap between the seal 12 and transition point 14b, and runs in close proximity to the body edge 16 so as to form a narrow channel 18, the upper boundary of which is formed by the valve layer 10, and the lower boundary by the bottom surface layer 4. The heat seal 12 ends at a point 20 on the body surface 6, leaving a channel opening 22 of small width.

Figure 3:
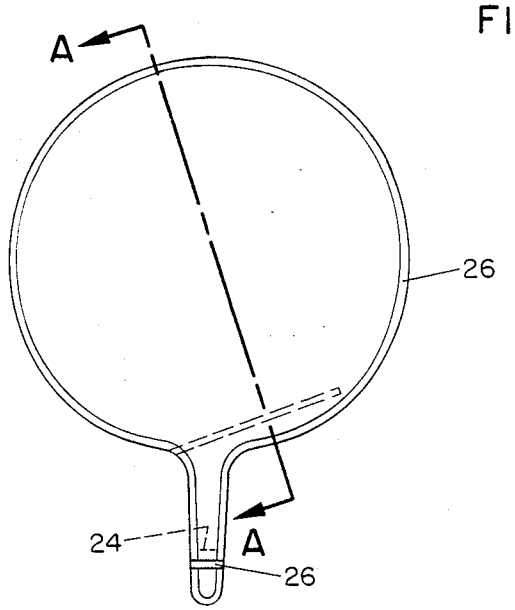
FIG. 3 is a top view of a balloon of the invention before the inflation thereof.
Figure 4:
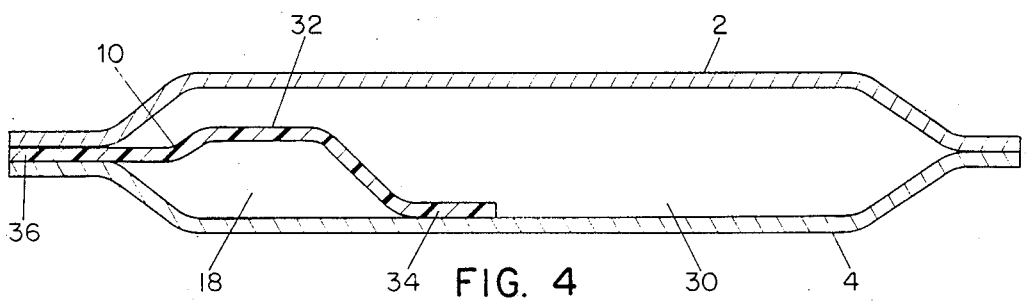
FIG. 4 is a cross-sectional view of the balloon of the invention before inflation, taken along line A–A of FIG. 3.
Figure 5:
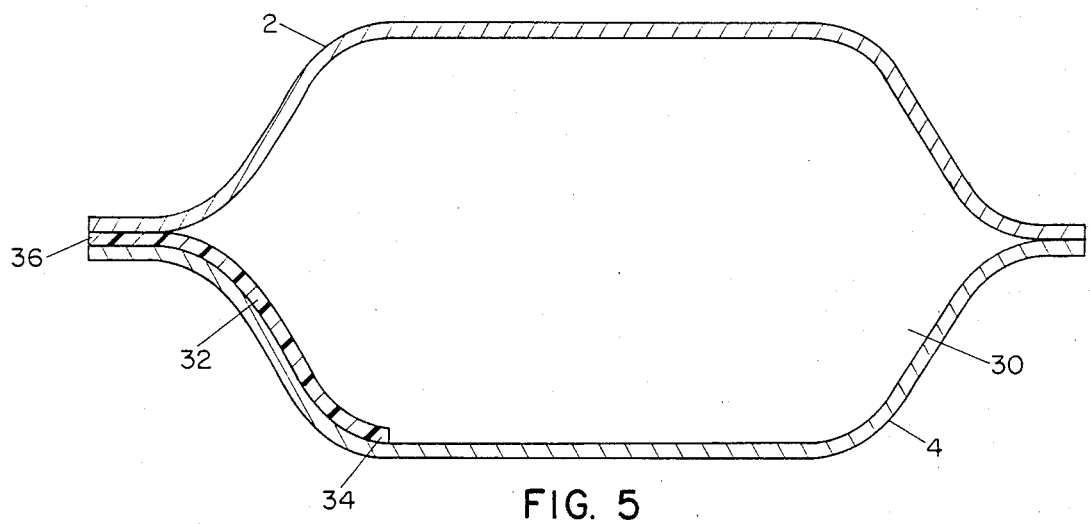
FIG. 5 is a cross-sectional view of the balloon of the invention of FIG. 4 after inflation.
Figure 6:
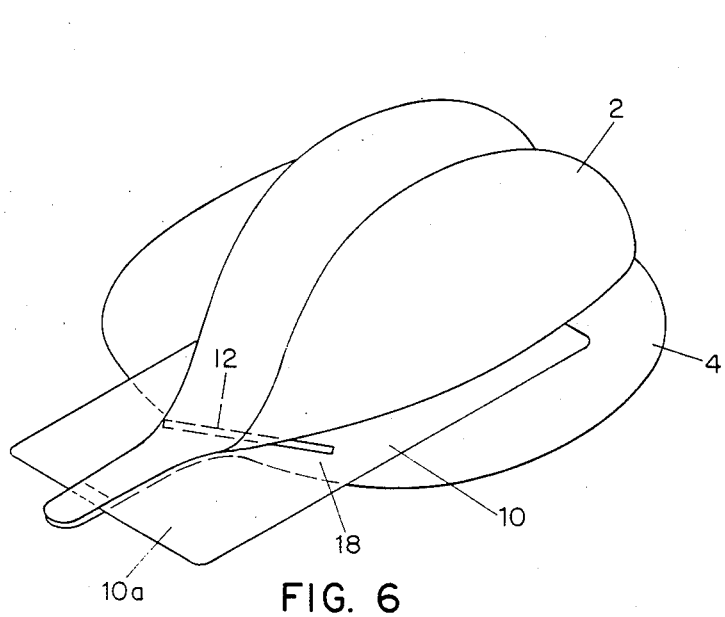
FIG. 6 is a projection view showing the top balloon film layer partially elevated.

As shown in FIG. 6, the top surface layer 2 is then correspondingly placed over the bottom layer 4 and valve layer 10. A second heat seal 26 is formed around the perimeter of the container, bonding the two surface layers 2, 4 together at their edges, as well as bonding the valve layer 10 to the surface layers 2, 4 at the perimeter thereof. Any excess film 10a extending beyond the second heat seal 26 may be trimmed and removed, the result being shown in FIG. 3. The channel 18 is longitudinally sealed by the first and second heat seals 12, 26.

The filling and sealing operations will now be discussed with reference to FIGS. 3–7. During filling operation, the nozzle of a standard balloon filling device is inserted into the exterior opening 24 so as to be in fluid communication with the interior of the container. The fluid may be air, helium or the like, but any gas or liquid is contemplated. As the fluid is forced into the container, it travels through the flat, but open, inlet channel 18, past the channel opening 22, and into the body cavity 30. As more fluid is forced into the body cavity 30 during inflation of the balloon, the pressure therein increases. The increasing pressure causes the cavity 30 to expand and the balloon surface layers 2, 4 to stretch. As the cavity reaches filling capacity, shown in FIG. 7, several forces act to collapse the inlet channel 18, shown in FIG. 5, automatically sealing the cavity 30 and preventing further filling thereof as well as preventing escape of the fluid therefrom.

Whenever the internal pressure of the cavity 30 surpasses the pressure in the inlet channel 18, the internal pressure bears down on the upper surface 32 of the valve film layer 10 which forms the upper boundary of the inlet channel 18, pressing the upper channel surface 32 sealingly against the bottom balloon layer 4 so as to effectively close the channel 18.

In addition, as the increasing pressure within the cavity 30 stretches the balloon surface layers 2, 4, the longitudinal bonding points 34, 36 forming the boundaries of the channel 18 become more distant from each other, thus laterally stretching the upper channel surface 32 flat against the bottom balloon layer 4, sealingly closing the channel 18.

Figure 7:
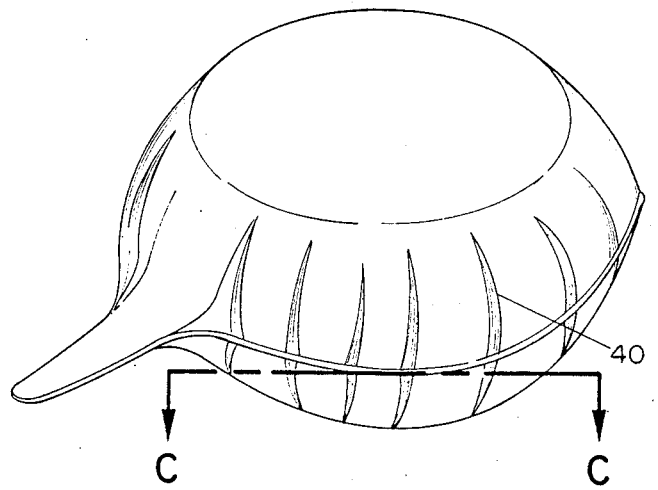
FIG. 7 is a projection view of the balloon of the invention after inflation.
Figure 12:
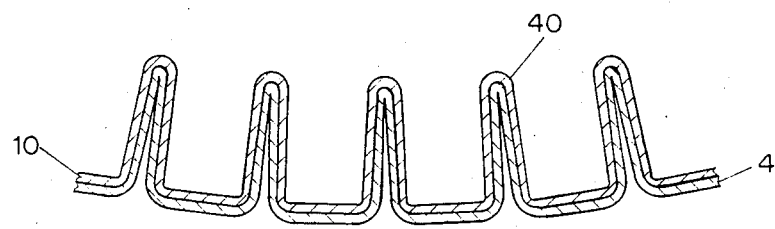
FIG. 12 is a cross-sectional view taken along line C—C of FIG. 7.
Figure 13:
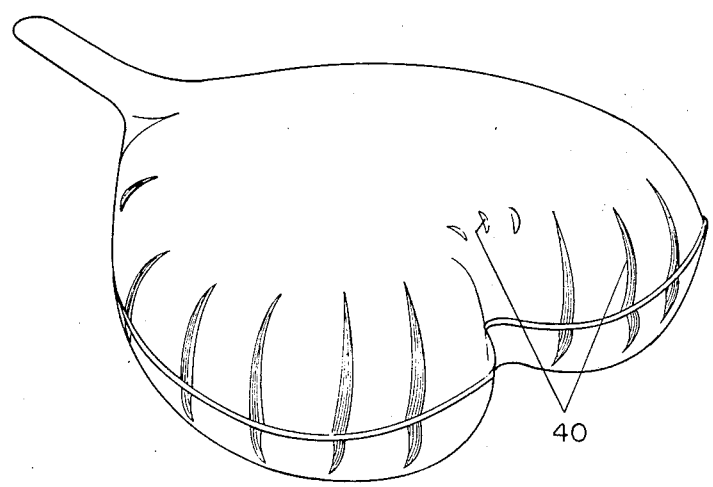
FIG. 13 is a projection view of another embodiment of the balloon of the invention after inflation.

As shown in FIGS. 7, 12 and 13 as fluid capacity is reached, perpendicular folds or creases 40 tend to form along the perimeter of the container. These creases 40 become extremely stiff and will further stretch apart the layers and aid in sealingly collapsing the channel, in conjunction with the above-described phenomena. The flat valve can be positioned and its dimensions varied in a manner by those skilled in the art that will allow this force to effectively prevent further inflation of the container at a desired set point that will prevent bursting due to over-inflation of a fragile container.

The seal formed by the creasing action is quite effective, as it acts as a sort of pressure leverage mechanism. The channel is closed to further flow even though the pressure inside the container may be less than the pressure at the entrance of the fill channel. Flat valve channels of past designs do not collapse and stop flow until the pressure inside the container is greater than the pressure at the entrance of the fill channel. Thus, any increase in pressure at the entrance of the fill channel will allow further flow into the container. This is overcome by the invention. When the container walls create deep folds and creases across the fill channel, a further increase in pressure will not be able to unfold the creases in the channel. This prevents further flow into the container even at pressures much greater than the pressure inside the container or the inlet channel.

A significant feature and benefit of the crease seal design is that it inherently creates an extremely short transition time between full inlet flow and zero flow. The crease seal design also features a self-regulating set point which closes the channel when the container is full and is virtually independent of the inlet fill pressure. Both features let users fill balloons faster without having to worry about slowing down to prevent bursting.

By comparison, the sealing forces employed by the prior art valves tend to be gradual shut-off mechanisms that constrict flow and slow down the filling process rather than truly stop it instantly before the balloon bursts. Also true with these other sealing forces is that the higher the inlet fill pressure the higher the pressure inside the container will be before it significantly slows down or stops inflating.

In general, for convex container edges on a container of the present invention, shown in FIG. 7, the crease is deepest at the perimeter of the container's seal and gradually gets shallower until it becomes nonexistent on the flatter surfaces of the container away from the perimeter. For concave curves at the perimeter of an inflated container, shown in FIG. 13, the creases do not extend through the perimeter seal; instead they form deepest midway between the perimeter seal and the flatter surfaces of the container. In general, the flatter surfaces referred to tend to be the areas most distant from any perimeter seals. Once one skilled in the art observes and understands the patterns of creases formed in a container, then it is a matter of judgment based on experience to position a filling channel across one or more creases in a manner that restricts inflation at a desired tightness or fullness of the container. The deeper the crease across the channel, the less full the container will get before the flow is shut off in the channel. By contrast a channel that does not cross any creases exhibits slowed flow rather than absolute shut off of flow as the internal container pressure increases.

This force due to the creasing action is the strongest force that acts to automatically prevent overfilling and bursting the balloon. The "full" pressure point may be varied by varying the channel dimensions and by varying the distance the channel is from the container perimeter.

Figure 8:
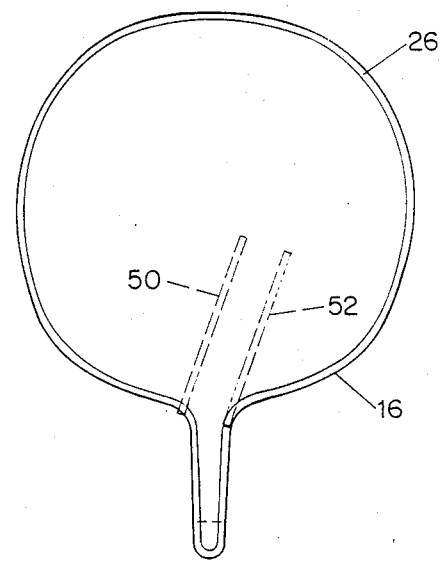
FIG. 8 is a top view showing another embodiment of the balloon of the invention.

Another embodiment is shown in FIG. 8. Two heat seals 50, 52 are applied to the valve film layer 10 and bottom balloon layer 4 to form the inlet channel 18 in a position away from the container edge. The position of the channel may be varied so as to control the pressure at which container will seal.

Figure 9:
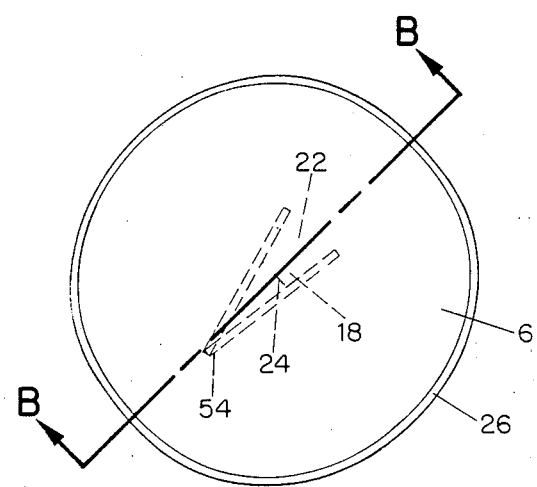
FIG. 9 is a top view showing a stemless embodiment of the balloon of the invention.
Figure 10:
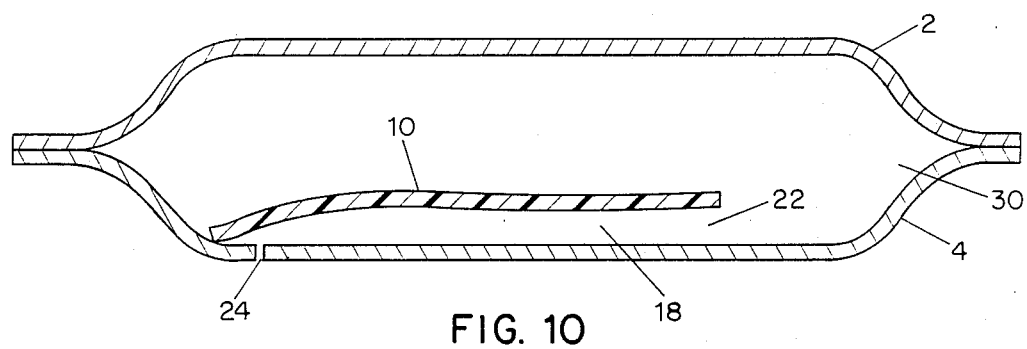
FIG. 10 is a cross-sectional view taken along line B—B of FIG. 9.

FIGS. 9 and 10 illustrate an additional embodiment which is characterized by the elimination of a stem portion. This is achieved by providing the exterior opening 24 on the body portion 6 of the balloon surface layer 4. The inlet channel 18 is formed by heat seals as described above, and may be located anywhere on the surface layer 4. The channel 18 has a closed end 54 formed by the intersection of two heat seals and an open end forming the channel opening 22.

The sealing force created by the creasing action may also be employed in conjunction with other known valves. For example, a multilayer flat valve may be attached to a balloon surface layer at a point where the creasing action and stretching force resulting therefrom will aid in providing a better seal as described above.

Figure 11:
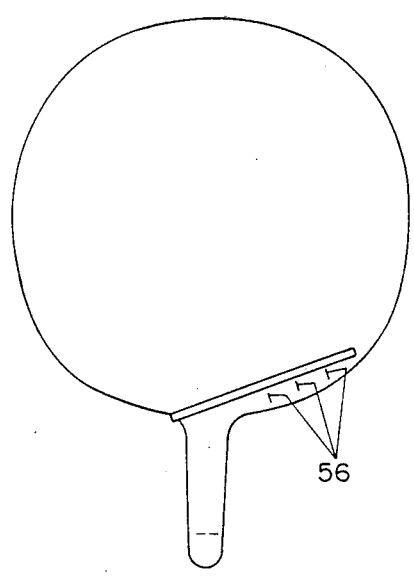
FIG. 11 is a top view of the valve layer and bottom surface layer showing additional micro-openings.

As shown in FIG. 11, another feature which may be present in any of the above-described inlet channels are channel micro-openings 56 formed as slits or tiny holes on the upper channel boundary 32 to communicate the channel passage to the body cavity. This feature necessitates sealing all edges of the channel 18 to the bottom balloon layer 4 which should provide an advantage of insuring that the two layers remain as absolutely flat against each other as possible. Further film handling required in the manufacture of the balloon would not affect the flatness of the valve after this seal is made. Such an embodiment aids the filling operation by providing more points of fluid communication between the channel 18 and the cavity 30. This also decreases the chances of "burning a hole" in the balloon surfaces, as stress upon the heat seals is more evenly distributed. The micro-openings 56 are sealed by the stretching of the film layers under increasing pressure. This phenomena also aids in preventing unwanted micro-leaks caused by flaws present in the film layers and seals throughout the balloon. The stretching of the layers under pressure tends to pull shut these micro-leaks.

Further, one or more micro-openings may be present in conjunction with the channel opening 22.

The present invention is a great advance in the balloon art. It eliminates the need for separate and more complex two and four layer valves by providing a single layer integral inlet channel with valve action. The claimed single layer valve is simpler and less expensive to assemble over the prior art valves, and further can be installed in-line as part of the balloon itself. Its simplicity of construction also results in fewer opportunities for flawed products. The novel design of the container, which uses several forces in conjunction, principally the force exerted by the creasing effect, to provide self-sealing action, results in a more effective seal and hence a more desirable product since it does not rely on the self-adherence of the film layers.

The tightening forces which act to seal the container also provide a unique self-regulating two-way seal which automatically prevents further filling once a desired internal pressure has been reached, thus reducing the number of burstings due to accidental overfilling, and eliminating the need for expensive regulating equipment.

An additional feature provided by the unique valve structure is that as the balloon reaches capacity during filling operation, the fluid flowing through the flat channel opening will emit a whistle or squeak which signals the user to stop filling.

The integral nature of the channel also provides a desired feature over the prior art valves which tend to cause additional problems as they freely extend into the balloon cavity.

An additional optional feature for use on products whose surfaces or seals may not be conducive to absolutely air-tight flat channels is the addition of an extremely viscous liquid or low pressure non-setting adhesive to the channel 18 that would effectively constrict flow through an otherwise imperfect flat channel valve.

I claim:

1. A container for holding fluid comprising two container film layers at least one of which has a first opening for the passage of fluid, said layers being joined at the perimeters thereof to form a perimeter seal, a valve film layer attached to an inner surface of the container film layer having said first opening, the valve film layer forming a fluid channel integral with said container film layer through which fluid is guided into the container from said first opening, the fluid channel being located on the container surface so as to perpendicularly cross one or more of a plurality of creases that develop in the inflated container surface, said creases being perpendicular to the perimeter seal, such that as the container attains maximum fluid capacity the fluid channel automatically collapses under the stress resulting from the lateral stretching of the valve film layer and the container layer forming the fluid channel and the stress of the creases acting on the fluid channel, thereby sealing the container so as to prevent the further introduction of fluid therein as well as the leaking out of fluid therefrom.

2. The container of claim 1 wherein said container film layers are heat sealed together at the perimeters thereof, said valve film layer is heat sealed to said inner surface, and said fluid channel covers said first opening at one end and extends away from said first opening toward a second opening at its opposite end in fluid communication with the interior cavity of the container.

3. The container of claim 2 wherein the container comprises a body portion and a stem portion extending therefrom, said first opening being located on said stem portion.

4. The container of claim 3 wherein said fluid channel is defined longitudinally by two approximately parallel heat seals extending from said stem portion towards the interior of the container.

5. The container of claim 4, wherein said heat seal located around the perimeter of the container functions as one of said approximately parallel heat seals defining the fluid channel.

6. The container of claim 5, wherein said second opening comprises a micro-opening placing said fluid channel in fluid communication with the interior cavity of the container, and which micro-opening is capable of being sealingly closed upon lateral stretching of the container film layers and the valve film layer.

7. The container of claim 1 wherein the inner surfaces of said fluid channel are coated with an adhesive or viscous liquid that further restricts the passage of fluid therethrough.

8. The container of claim 2, wherein said container is a balloon.

9. A container for holding fluid comprising two container film layers sealed together at the perimeters thereof and a flat check valve having multiple valve film layers through which fluid is introduced into the container, wherein the valve is attached to at least one point on an interior container surface so as to cross one or more of a plurality of creases that develop in the inflated container surface, said creases being perpendicular to the perimeters, such that as the container attains maximum fluid capacity said valve automatically collapses under the stress resulting from the lateral stretching of the container layer and the valve layers attached thereto and the stress of the creases acting on the valve film layers, thereby sealing the valve so as to prevent the further introduction of fluid into the container as well as the leaking out of fluid therefrom.

* * * * *